United States Patent
Gronowicz, Jr.

(10) Patent No.: US 6,860,454 B1
(45) Date of Patent: Mar. 1, 2005

(54) SIZE ADJUSTABLE CLIP FOR FLEXIBLE FLAT CABLES

(75) Inventor: William Gronowicz, Jr., Westland, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/346,385

(22) Filed: Jan. 17, 2003

(51) Int. Cl.⁷ .............................................. F16B 45/00
(52) U.S. Cl. ...................................... 248/71; 248/67.7
(58) Field of Search .......................... 248/67.7, 70, 71, 248/74.5, 65, 316.7, 316.3, 231.81, 294.1, 316.5, 231.51

(56) References Cited

U.S. PATENT DOCUMENTS

| | | | | |
|---|---|---|---|---|
| 3,018,080 A | * | 1/1962 | Loudon | 248/228.4 |
| 3,023,989 A | * | 3/1962 | White | 248/68.1 |
| 3,252,677 A | * | 5/1966 | Raymond | 248/68.1 |
| 3,494,580 A | | 2/1970 | Thorsman | 248/68 |
| 3,601,863 A | | 8/1971 | Dorsey | 24/16 PB |
| 3,856,244 A | * | 12/1974 | Menshen | 248/67.5 |
| 3,894,706 A | * | 7/1975 | Mizusawa | 248/68.1 |
| 4,224,721 A | * | 9/1980 | Ohlson | 248/68.1 |
| T100,605 I4 | * | 5/1981 | Christian | 248/68.1 |
| 4,273,465 A | * | 6/1981 | Schoen | 403/391 |
| 4,457,482 A | | 7/1984 | Kitagawa | 248/74.3 |
| 4,669,688 A | * | 6/1987 | Itoh et al. | 248/74.2 |
| 4,918,261 A | | 4/1990 | Takahashi et al. | 174/135 |
| 4,936,530 A | * | 6/1990 | Wollar | 248/71 |
| 5,184,794 A | * | 2/1993 | Saito | 248/68.1 |
| 5,201,484 A | * | 4/1993 | Thoen | 248/68.1 |
| 5,769,556 A | * | 6/1998 | Colley | 403/24 |
| 5,794,897 A | * | 8/1998 | Jobin et al. | 248/74.4 |
| 5,820,048 A | * | 10/1998 | Shereyk et al. | 248/68.1 |
| 5,992,802 A | * | 11/1999 | Campbell | 248/68.1 |
| D417,378 S | * | 12/1999 | Smith | D8/72 |
| 6,464,181 B2 | * | 10/2002 | Sakakura | 248/68.1 |
| 6,523,790 B2 | * | 2/2003 | Sentpali et al. | 248/68.1 |

FOREIGN PATENT DOCUMENTS

| JP | 07-231539 | 8/1995 | 3/26 |
|---|---|---|---|
| JP | 09-089164 | 3/1997 | 3/8 |

* cited by examiner

Primary Examiner—Leslie A. Braun
Assistant Examiner—A. Joseph Wujciak
(74) Attorney, Agent, or Firm—Young & Basile, P.C.

(57) ABSTRACT

An adjustable clip for flexible flat cables comprising a pair of pivotally interconnected scissors arms having retainer tabs on the opposite ends and detents so that angle between the arms can be set in any of several different positions to accommodate FFCs of different widths. A bayonet fastener extends through a center hub portion so as to be forcibly inserted into a preformed hole in a support structure such as an automotive body pillar.

9 Claims, 3 Drawing Sheets

SIZE ADJUSTABLE CLIP FOR FLEXIBLE FLAT CABLES

FIELD OF THE INVENTION

This invention relates to cable anchors, often called "clips," for securing flexible flat cables to structural support members by means of bayonet fasteners and particularly to a device of the type described which is adjustable for receiving and securing flexible flat cables of different widths.

BACKGROUND OF THE INVENTION

It is known to anchor wiring harnesses to automotive body structures by means of clips which include a first portion which surrounds or otherwise attaches to the harness and a second portion such as a bayonet fastener which can be forced into a preformed hole in the body structure. The bayonet fastener is often called a "Christmas tree," is made of plastic, and can take any of several forms all of which include barbs which deform to enter the hole and resist being withdrawn.

It is now becoming common to use flexible flat cables ("FFCs") instead of more conventional bundled wires. An FFC is illustrated herein as comprising a plurality of parallel spaced apart flat conductors embedded in a flexible, plastic insulator.

The prior art shows one FFC anchor in the form of a flexible C-shaped plastic clip having an integral bayonet fastener extending from the clip base. An anchor of this design can only be used with an FFC having a width corresponding generally to the inside dimension of the C-shaped clip. Where FFCs of different widths are used, supplies of several different size anchors must be provided.

Adjustable clip-type anchors to accommodate FFCs of different widths are known. In general, such devices comprise multi-component ratchet or strap-type structures which are complex to make and use.

SUMMARY OF THE INVENTION

The present invention is a clip-type anchor for securing FFCs to support structures having one or more preformed holes by means of a bayonet fastener which can be inserted into the hole and retained by the structure after insertion. The device of the present invention accommodates FFCs of different widths, yet is simple and economical to both make and use.

In general, the present invention comprises a clip-type fastener device having first and second pivotally connected arms to form a scissors-type structure with retainer tabs at the ends. Using the scissors-action, the ends of the arms can be spread to receive the FFC and then closed to a degree to hold the FFC in place. A bayonet fastener projecting outwardly from the assembled arms is designed to be forced into a preformed hole to hold the FFC and clip in a desired location.

In the preferred embodiment, the lower arm has a central recess and the upper arm is shaped to fit into the recess such that the top surfaces of the two arms are essentially coplanar. The arms are provided with complemental bearing structures which can be snapped together to provide not only the pivotal scissors action, but also a mechanical retention which holds the two arms together. The bayonet fastener preferably extends through the center of the two arms and is held in position by a head and directional barbs on a shaft extending from the head. In this fashion, it is not necessary for the bayonet fastener to extend through the FFC and take up space which might otherwise be devoted to conductive material.

The components of the present invention are preferably formed by injection molding a suitable plastic such as Nylon to afford a measure of pliability. Means such as detents may be provided for releasably retaining the arms in one or more angular relationships to accommodate FFCs of predetermined widths.

Other features and advantages of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
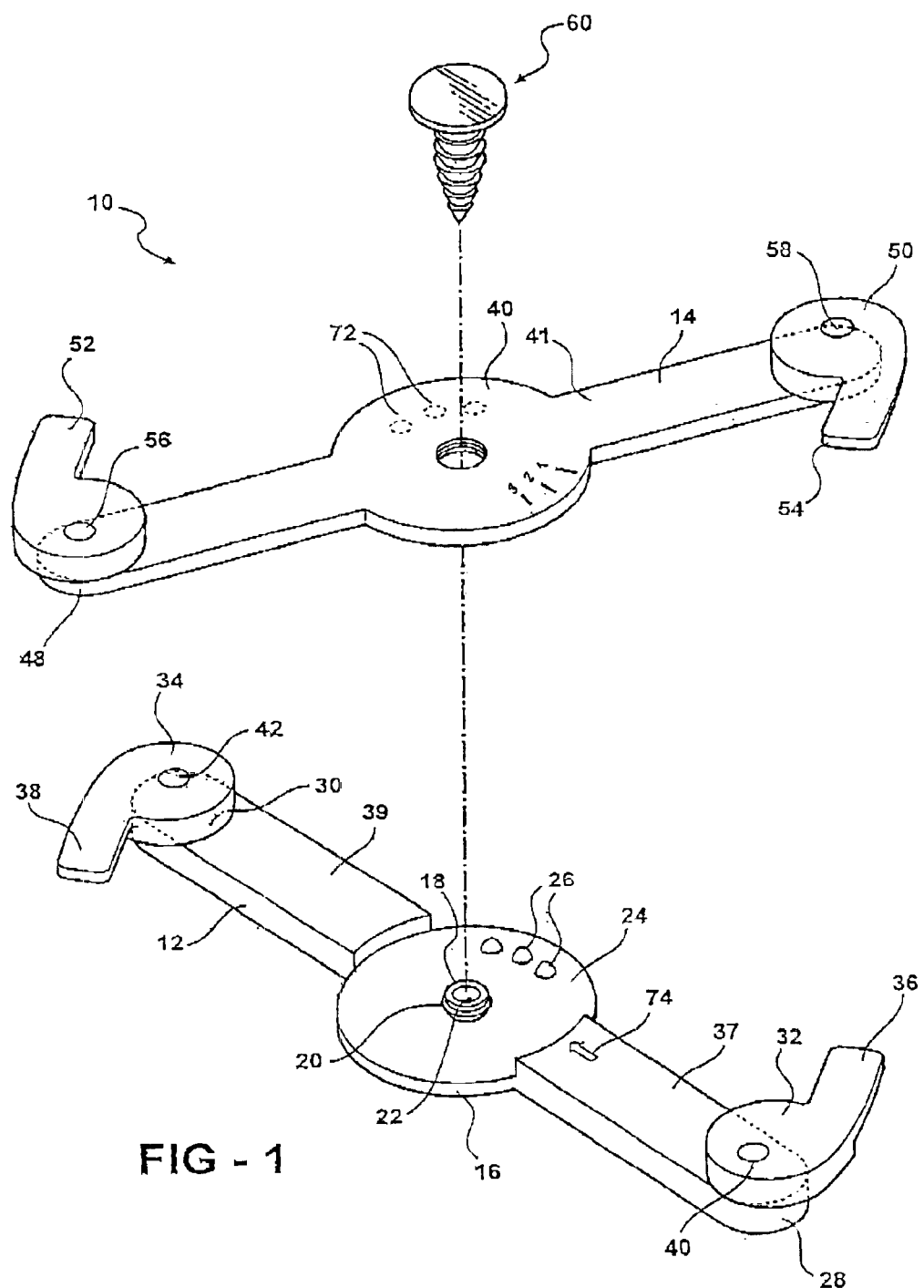
FIG. 1 is an exploded perspective view of an adjustable FFC anchor embodying the present invention.

Referring now to the figures, the anchor 10 of the present invention is shown to comprise a pair of injection molded plastic arms 12 and 14 which are preferably but not necessarily of equal length. The lower arm 12 has a circular central portion 16 carrying a raised cylindrical bearing structure 18 with an enlarged annular retainer ring 20 formed thereon. A central hole 22 defining an axis of rotation extends through the structure 18 to receive a barbed fastener 60. The portion 16 has a recessed surface 24 which lies below surfaces 37 and 39 and which is planar except for the bearing structure 18 and a plurality of arcuately arranged raised detents 26 for purposes to be described.

The lower arm 12 has opposite ends 28 and 30 with raised retainer tabs 32 and 34 having oppositely extending tab arms 36 and 38, respectively. The under surfaces of the arms 36, 38 are spaced above planar arm surfaces 37 and 39 by the thickness of an FFC 66 (shown in FIG. 3 only), which is to be anchored by the device 10. Through-holes 40 and 42 are provided in the tab structures 32 and 34 and arms 36 and 38 for purposes to be described.

The upper arm 14 is provided with a circular central portion 40 having through-hole 43 which is dimensional to complementary receive the bearing structure 18 of the lower arm 12. The hole 43 is provided with an enlarged diameter annular portion 44 (shown in FIG. 2 only) to receive the annular retainer ring 20 of the lower arm 12 in a snap-lock fashion to hold the two arms 12 and 14 together in a pivotal scissors-type relationship that allows changes in the angular relationship between the two arms 12 and 24 for purposes to be described.

The under surface of the central portion 40 of the upper arm is provided with recesses 72 which cooperate with the detents 26 to permit the arms 12 and 14 to be releasably retained in each of three different angular relationships corresponding to three different FFC widths.

Figure 2:
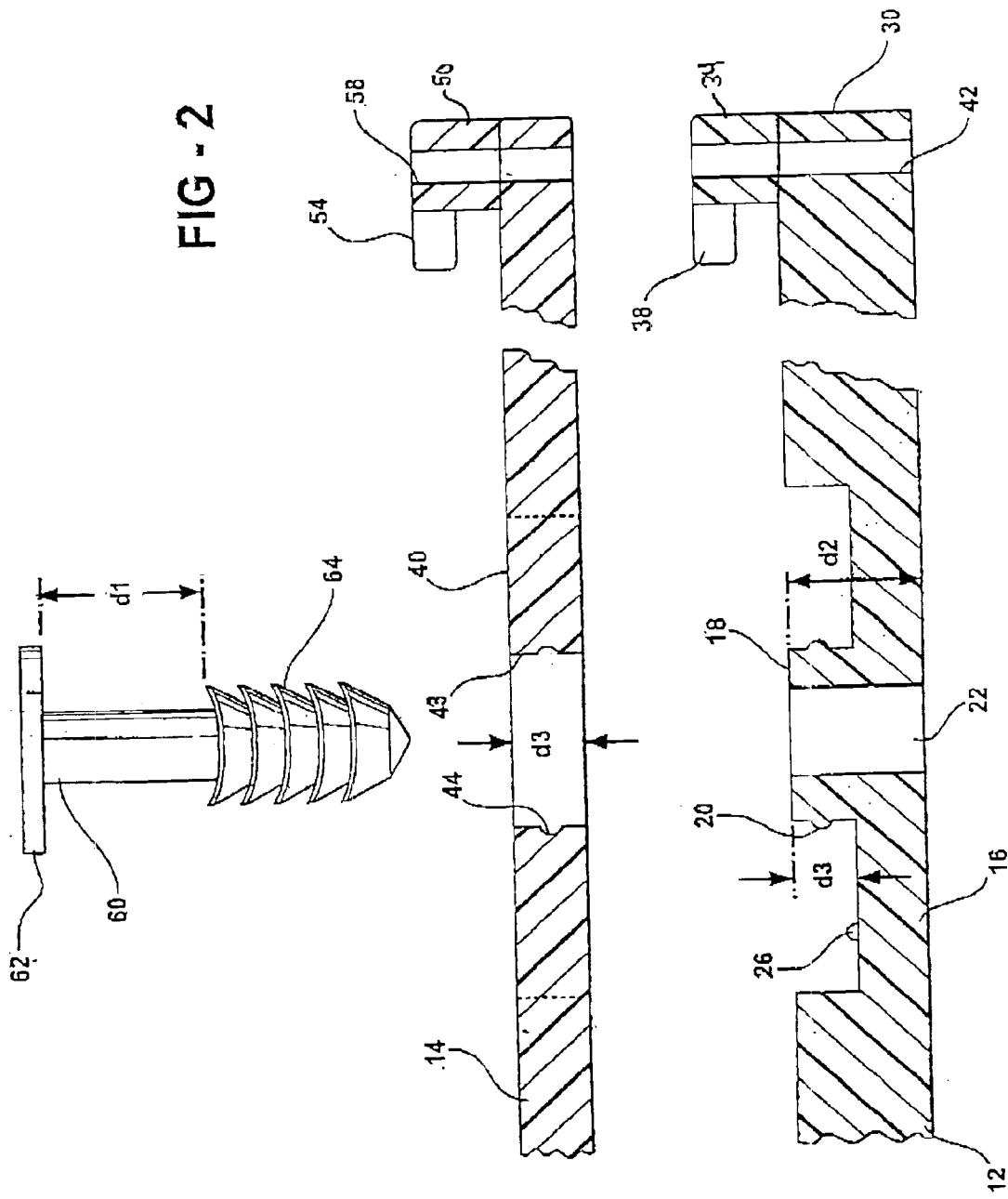
FIG. 2 is an exploded sectional view of the components of the device of FIG. 1.

When assembled, the top surface 41 of the upper arm 14 is essentially coplanar with the surfaces 37 and 39 of the lower arm 12. The height d3 of the bearing 18 is equal to the thickness of the arm 14 as shown in FIG. 2.

Figure 3:
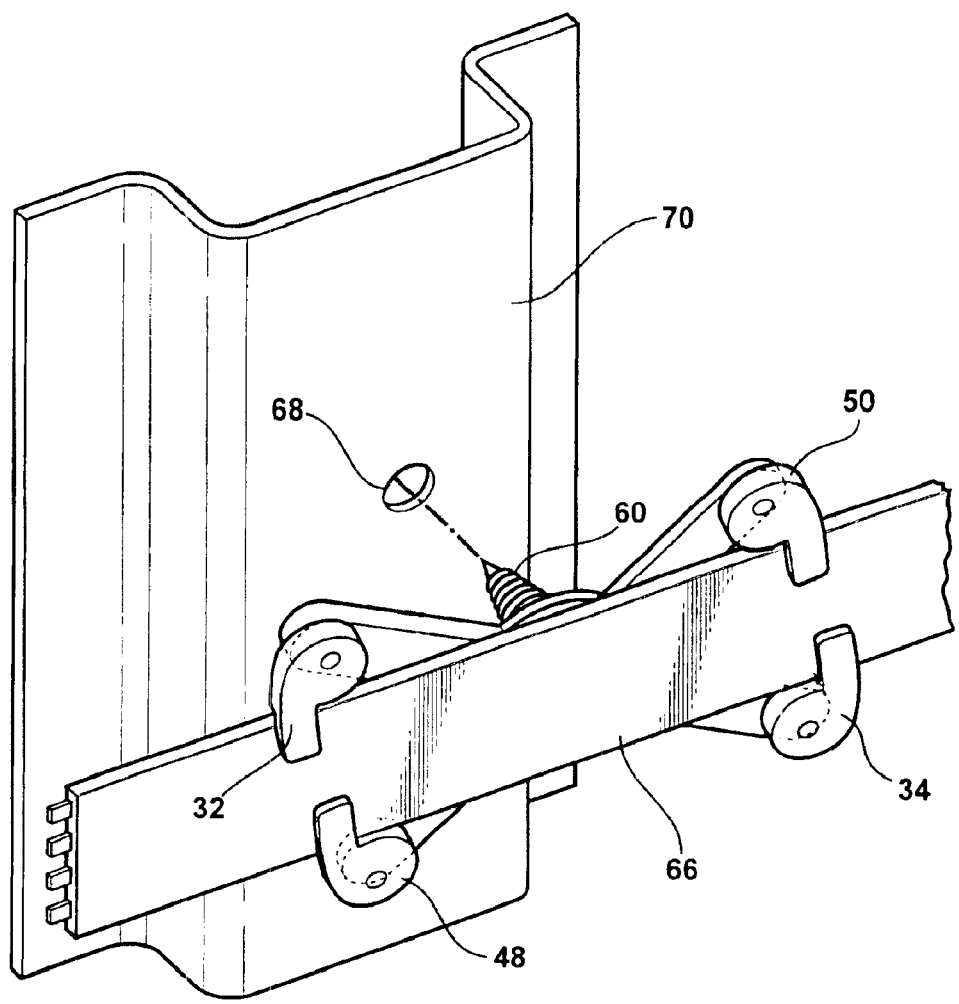
FIG. 3 is a perspective view of the device of FIGS. 1 and 2 after assembly of the fastener to an FFC but before inserting the bayonet fastener into a preformed hole in an automotive body structure.

The upper arm 14 also has opposite ends at which are provided retainer tabs 48 and 50 with oppositely extending fingers 52 and 54 to receive and hold an FFC as shown in FIG. 3. Holes 56 and 58 are formed in the retainer tabs 48 and 50 and arms for purposes to be described.

The anchor 10 is completed by means of a bayonet fastener 60 having an enlarged flat head 62 and a series of unidirectional barbs 64 which relatively easily enter a hole but resist withdrawal. The device 60 is of conventional construction, is often referred to as a "Christmas tree." The length d1 between the under surface of the head 62 and the top of the first barb 64 is approximately equal to the dimension d2 of the arm 12 as shown in FIG. 2.

The assembled condition is shown in FIG. 3. The arms 12, 14 are snapped together and the fastener 60 is pushed through the center hole 22. An FFC 66 is inserted into the anchor 10 by spreading the opposite ends of the arms 12, 14 sufficiently to permit insertion of the FFC 66 onto the surfaces 37, 39 and 41 and under the lateral extensions 36, 38, 52 and 54 of the retainer tabs. The arms 12, 14 are squeezed together to grip the FFC 66. The barbs 64 are thereafter forcibly inserted into and through hole 68 which is formed in the automotive body structure 70 to hold the FFC 66 and the anchor 10 in the desired position.

The width of the FFC 66 corresponds to the distance between the opposite ends of the arms 12 and 14 when in one of the positions corresponding to the locations of the detents 26 on the lower arm 12 and the recess 72 in the undersurface of the upper arm 14 as shown in FIG. 2. Indicia may be molded into or otherwise formed on the visible upper surfaces of the arms 12 and 14 as shown in FIG. 1 to indicate to the user which FFC width is in use.

Various modifications and additions to the illustrated structures are possible. By way of example, the arm 12 may be made slightly longer than the arm 14 to cause the inwardly extending retainer tabs 38 and 54 to pass over and under one another to prevent interference. The retainer tab fingers may alternatively be angled differently, as shown, to achieve the same result. Also, by way of example, the bayonet fastener 60 may be formed integrally with the lower arm 14. Additional bayonet fasteners may be used in connection with the holes 40, 42, 56 and 58 formed in the retainer tab structure at the ends of the arms 12, 14 if additional security in the anchoring of the assembly to a body structure or the like is necessary and available.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An adjustable anchor securing a flexible flat cable to a support having a preformed hole, the adjustable anchor comprising:

first and second arms, each arm having a top surface, and opposite ends;

retainer tabs formed on the ends, extending laterally therefrom and spaced above said top surfaces by approximately the thickness of a flexible flat cable;

said arms being pivotally interconnected to define a common axis of rotation such that the arms can rotate relative to each other about the axis of rotation so the spacing between the ends of the arms may be selectively increased and decreased wherein the first and second arms are arranged one above the other and the lower arm is recessed around the bearing element of the lower arm to receive the upper arm such that the top surfaces of the two arms in the assembled condition are essentially coplanar; and a bayonet fastener extending from one of the arms along the axis of rotation for insertion into said preformed hole.

2. An anchor a defined in claim 1 wherein the bayonet fastener is separate from the arms.

3. An anchor as defined in claim 1 wherein the arms include complemental bearing elements.

4. An anther as defined in claim 1 wherein the arms are of the same length.

5. An anchor as defined in claim 1 wherein the aims are formed of plastic.

6. An anchor as defined in claim 1 further including detent means on said first and second arms to retain the arms in a fixed angular relationship.

7. An adjustable anchor securing a flexible flat cable to support structure having a preformed hole, the adjustable anchor comprising:

first and second arms, each arm having a top surface, and opposite ends;

retainer tabs formed on the ends, extending laterally therefrom and spaced above said top surfaces by approximately the thickness of a flexible flat cable;

said arms being pivotally interconnected to define an axis of rotation such that the spacing between the ends of the arms may be selectively increased and decreased;

a bayonet fastener extending from one of the arms along the axis of rotation for insertion into said preformed hole; and means cooperatively arranged on said first and second arms for selectively maintaining the arms in each of a series of different angular relationships.

8. An anchor as defined in claim 7 further including indicia on at least one of said aims for indicating the selected angular relationship.

9. An adjustable anchor securing a flexible flat cable to support structure having a preformed hole, the adjustable anchor comprising:

first and second arms, each arm having a top surface, and opposite ends;

retainer tabs formed on the ends, extending laterally therefrom and spaced above said top surfaces by approximately the thickness of a flexible flat cable, further including holes formed in said tabs;

said arms being pivotally interconnected to define a common axis of rotation such that the arms can rotate relative to each other about the axis of rotation so the spacing between the ends of the arms may be selectively increased and decreased; and a bayonet fastener extending from one of the arms along the axis of rotation for insertion into said preformed hole.

* * * * *